US012419309B2

(12) United States Patent
Ward et al.

(10) Patent No.: US 12,419,309 B2
(45) Date of Patent: Sep. 23, 2025

(54) CHEMICAL COMPOSITION FOR SEED TREATMENT

(71) Applicant: Yara UK Limited, Grimsby (GB)

(72) Inventors: Stuart Ward, Grimsby (GB); Jonathan Brown, Grimsby (GB); Caroline Quignon, Grimsby (GB)

(73) Assignee: Yara UK Limited, Grimsby (GB)

( * ) Notice: Subject to any disclaimer, the term of this patent is extended or adjusted under 35 U.S.C. 154(b) by 788 days.

(21) Appl. No.: 17/611,746

(22) PCT Filed: Jun. 4, 2020

(86) PCT No.: PCT/GB2020/051347
§ 371 (c)(1),
(2) Date: Nov. 16, 2021

(87) PCT Pub. No.: WO2020/245586
PCT Pub. Date: Dec. 10, 2020

(65) Prior Publication Data
US 2022/0232832 A1 Jul. 28, 2022

(30) Foreign Application Priority Data

Jun. 5, 2019 (GB) ..................................... 1908025

(51) Int. Cl.
| | | |
|---|---|---|
| A01N 59/26 | (2006.01) | |
| A01C 1/06 | (2006.01) | |
| A01N 25/00 | (2006.01) | |
| A01N 33/08 | (2006.01) | |
| A01N 57/20 | (2006.01) | |
| A01N 59/16 | (2006.01) | |

(52) U.S. Cl.
CPC ............... *A01N 59/26* (2013.01); *A01C 1/06* (2013.01); *A01N 25/00* (2013.01); *A01N 33/08* (2013.01); *A01N 57/20* (2013.01); *A01N 59/16* (2013.01)

(58) Field of Classification Search
CPC ........ A01N 59/26; A01N 25/00; A01N 57/36; A01C 1/06; C05B 17/00; C05G 3/00; C05G 5/20; C05D 9/02
See application file for complete search history.

(56) References Cited

U.S. PATENT DOCUMENTS

| | | | | |
|---|---|---|---|---|
| 3,798,020 | A | * | 3/1974 | Parham, Jr. ............. C05D 9/02 71/64.1 |
| 5,797,976 | A | | 8/1998 | Yamashita |
| 7,591,100 | B2 | | 9/2009 | Sato |
| 9,023,762 | B2 | * | 5/2015 | Devisetty ............... A01N 43/90 504/136 |
| 9,554,502 | B2 | | 1/2017 | Madsen et al. |
| 10,239,798 | B2 | | 3/2019 | Smith et al. |
| 2004/0063582 | A1 | | 4/2004 | Johnson |
| 2007/0190209 | A1 | | 8/2007 | Sinnott |
| 2014/0011675 | A1 | | 1/2014 | Knochenmus et al. |
| 2018/0346389 | A1 | | 12/2018 | Castellani et al. |

FOREIGN PATENT DOCUMENTS

| | | | |
|---|---|---|---|
| CA | 512197 | A | 4/1955 |
| CN | 1468505 | A | 1/2004 |
| CN | 101553134 | A | 10/2009 |
| CN | 102438439 | A | 5/2012 |
| CN | 104342390 | A | 2/2015 |
| CN | 104640825 | A | 5/2015 |
| GB | 2568945 | A | 6/2019 |
| KR | 20130132924 | A | 12/2013 |
| NO | 120339 | * | 10/1970 |
| NO | 120339 | B * | 10/1970 |
| WO | 2008/090290 | A2 | 7/2008 |

OTHER PUBLICATIONS

International Search Report and Written Opinion mailed Sep. 25, 2020 in corresponding International Application No. PCT/GB2020/051347.
International Preliminary Report on Patentability mailed Aug. 16, 2021 in corresponding International Application No. PCT/GB2020/051347.
Combined Search and Examination Report mailed Dec. 2, 2019 in corresponding United Kingdom Application No. GB1908025.8.
Written Opinion of the International Preliminary Examining Authority mailed Feb. 19, 2021 in corresponding International Application No. PCT/GB2020/051347.

* cited by examiner

*Primary Examiner* — Mina Haghighatian
(74) *Attorney, Agent, or Firm* — Renner, Otto, Boisselle & Sklar, LLP.

(57) ABSTRACT

A liquid composition the treatment of seeds of leguminous crops is disclosed. The liquid composition comprises phosphorus, molybdenum, cobalt and a solvent, wherein cobalt is present as vitamin B12 and the composition has a pH between 6.0 and 7.5, and wherein the composition comprises monoethanolamine. A method of preparing seeds of leguminous crops is also disclosed, comprising the steps of coating the seeds with the liquid composition, coating the seeds with a composition comprising a rhizobia inoculant, and drying the seeds coated with both compositions.

18 Claims, No Drawings

CHEMICAL COMPOSITION FOR SEED TREATMENT

This application is a national phase of International Application No. PCT/GB2020/051347 filed Jun. 4, 2020, which claims priority to United Kingdom Application No. 1908025.8 filed Jun. 5, 2019, all of which are hereby incorporated herein by reference in their entireties.

FIELD OF THE INVENTION

The present invention provides a composition comprising phosphorus, molybdenum, vitamin B12 and an amine. It also provides a method to prepare such a composition and a method to prepare seeds. It is also related to the use of a composition comprising phosphorus, molybdenum, vitamin B12 and an amine for the treatment of seeds of leguminous crops.

BACKGROUND OF THE INVENTION

The coating of seeds in agriculture is well known in the prior art and is carried out for a variety of reasons.

Treatment of seeds in order to combat pests and disease has been practised for hundreds of years, beginning with the use of simple inorganic substances such as arsenic, copper sulphate and sulphur to control fungal disease in cereal crops. The first proof of the activity of copper sulphate against wheat bunt was reported by Schulthess in 1761. The first broad spectrum organic fungicide, Thiram (Tisdale and Flenner) was introduced in 1942 and the first organic insecticidal seed treatment, γ-hexachlorocyclohexane (Slade) in 1945.

Early seed treatment products were powders but modern formulations tend to be liquids because these are safer to use and have improved application properties. Liquid plant protection seed treatments are available in many formulation types such as solutions, emulsions, suspension concentrates and capsule suspensions. Liquid formulations may be based on organic solvents or water-based.

Coating seeds with plant nutrients or fertilizers is also known in the prior art. Phosphorus is an interesting nutrient to supply to seeds because they favour root growth which increases the ability of the plant to absorb nutrients from the soil.

In the case of leguminous crops such as soybean (*Glycine max*), alfalfa (*Medicago sativa*), clover (*Trifolium*), peas (*Pisum sativum*), chickpeas (*Cicer arietinum*), green beans (*Phaseolus vulgaris*), lentils (*Lens culinaris*) and peanuts (*Arachis hypogaea*) it is common practice to treat seed with rhizobia inoculants. Leguminous plants are able to form symbiotic relationships with rhizobia bacteria within root nodules which can fix atmospheric nitrogen, converting it into forms which the plant can then use.

Application of rhizobia inoculant to legume seeds can enhance this process and improve productivity. Inoculant compositions in commercial use are available in dry, peat-based preparations such as those described in CA512197, or as liquid formulations.

It is well known that the micronutrients molybdenum (Mo) and cobalt (Co) are involved in the nitrogen fixation process within leguminous plants and it has become common practise in agriculture to apply fertilizer seed treatment compositions containing these two micronutrients along with inoculants. Typically, commercially available fertilizer seed treatments of this type are based on inorganic salts such as sodium or ammonium molybdate as the molybdenum source; and inorganic salts such as cobalt (II) sulphate, dinitrate, dichloride, diacetate, carbonate or hydroxide as the cobalt source. Chelated forms of cobalt such as cobalt EDTA, cobalt gluconate, cobalt glucoheptonate and cobalt citrate have also been used as the cobalt source in such preparations. Typical commercially available products of this type are aqueous liquid compositions containing between about 5% and 15% w/w Mo and between 1% and 2% w/w Co. Examples of commercially available products are: Stoller CoMo (Stoller Enterprises Inc.) which contains 6% w/w Mo as sodium molybdate and 1% w/w Co as cobalt sulphate; Wuxal Extra CoMo 15 (Aglukon Spezialdunger GmbH & Co KG) which contains 150 g/l Mo (10.3% w/w) and 15 g/l Co (1.03% w/w); MolyMix (Spray Gro) which contains 4.5% w/w Mo and 1.8% w/w Co.

However, these cobalt sources all present serious hazards to human health. For example, cobalt (II) sulphate, dichloride, dinitrate, diacetate and carbonate are all classified under the Global Harmonized System as carcinogenic and toxic for reproduction. Furthermore, under the European Union's REACH regulation all these cobalt salts are included on ECHA's List of Substances of Very High Concern for Authorization. The current practice presents a major health risk for operators and farmers who handle and apply these products onto seeds. In particular there is a significant risk of exposure to hazardous dust created in the handling of treated seeds. A safer alternative is therefore required.

U.S. Pat. No. 5,797,976A (Yamashita, 1998) discloses compositions comprising a carbon/skeleton energy component, a macronutrient component containing at least one nitrogen and one phosphorus source and a vitamin/cofactor component. These compositions can be used in agriculture in a number of ways, incl. as a coating for seeds. In particular, a composition comprising 2 wt % of phosphorus, 0.003 wt % of molybdenum and 0.02 wt % of cyanocobalamin is disclosed.

US2004/063582A1 (Johnson, 2004) discloses compositions comprising at least one macronutrient, at least one micronutrient, a pest inhibitor, at least one growth regulator, a vitamin/cofactor component, an amino-acid component, a penetrant and an energy source, for seed treatment.

WO2008/090290A2 (INRA, 2008) discloses synthetic cell culture medium compositions comprising minor amounts of phosphorus, molybdenum, ethanolamine, and vitamin B12 among other components.

GB2568945A (Yara UK, 2019) discloses compositions comprising ethanolamine and phosphorus.

SUMMARY OF THE INVENTION

According to a first aspect, a liquid composition comprising phosphorus, molybdenum, cobalt, a solvent and monoethanolamine is provided. Cobalt is present as vitamin B12 and the composition has a pH between 6.0 and 7.5.

According to another aspect, a method to prepare a liquid composition comprising phosphorus, molybdenum, cobalt and monoethanolamine is provided. The method comprises the steps of providing a source of phosphorus, a source of molybdenum, a source of vitamin B 12, and monoethanolamine; mixing the source of phosphorus, the source of molybdenum, and the source of vitamin B12 with a solvent; and adding an amount of monoethanolamine such that the pH is between 6.0 and 7.5.

According to another aspect, a method of preparing seeds of leguminous crops is provided. The method comprises the steps of coating the seeds with the liquid composition described herein, coating the seeds with a composition comprising a rhizobia inoculant and drying the seeds coated with the two compositions.

According to another aspect, the use of a liquid composition as defined herein for the treatment of seeds of leguminous crops, in particular to improve germination, is provided.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight percent", "% wt" or "weight %", here and throughout the description unless otherwise defined, refers to the relative weight of the respective component based on the overall weight of the formulation.

As used herein, a source of phosphorus refers to a molecule, a salt or a complex that contains phosphorus atoms that is available to the plants, i.e. that the plants will absorb the molecule, salt or complex and will be able to use the phosphorus contained herein for its growth and development. It is noted that the different vitamers of vitamin B12 contain at least one P atom, however, this P atom is embedded in the vitamin B12 molecule and will not be used by the plant as a P source. Suitable P sources are well known in the agriculture field and include orthophosphoric acid, polyphosphoric acids, any salts thereof, for example, monoammonium phosphate, diammonium phosphate, potassium phosphate, and urea phosphate.

According to a first aspect, a liquid composition comprising phosphorus, molybdenum, cobalt, a solvent and monoethanolamine is provided. Cobalt is present as vitamin B12 and the composition has a pH between 6.0 and 7.5.

It is known in the field of agriculture to coat seeds with a composition comprising phosphorus, molybdenum and cobalt. Phosphorus (P) contributes among other things to root growth. Coating a seed with an available source of phosphorus ensures that the seed has enough phosphorus for the first growth stage and enables to grow strong and long roots that will be able to absorb the required nutrients from the soil, once the nutrients coated on the seeds are consumed. Molybdenum (Mo) is a micronutrient required by plants and is known to be involved in a range of biological processes in plants. For example, it is required for the synthesis and activity of the enzyme nitrate reductase which reduces nitrate-nitrogen in the plant. Mo is also essential for the symbiotic fixation of nitrogen by Rhizobia bacteria in legume root nodules which relies on the activity of the bacterial Mo-dependent enzyme nitrogenase. Cobalt (Co) also plays a role in symbiotic nitrogen fixation and is complementary with Mo. Cobalt is an essential component of vitamin B12 which is involved in several biochemical processes and is vital for the growth and development of Rhizobia bacteria. Compositions for seed treatment usually comprise a cobalt salt or chelate as a cobalt source. However, it is known that at least part of the cobalt is transformed into vitamin B12. So, it was hypothesized that supplying directly vitamin B12 to the seed would increase the efficiency of the cobalt nutrition. An important criterion for compositions to be coated on seeds, especially on seeds of leguminous crops is their pH. Indeed, seeds of leguminous crops are often sprayed with a rhizobia inoculant. Rhizobia are bacteria capable to fixing the nitrogen gas from the atmosphere to a form available to plants, for example ammonium ions, which can subsequently be transformed into nitrates, which are even more available to plants than ammonium. Rhizobia prefer an environment with a neutral pH. A pH between 6.0 and 7.5 is considered ideal for the growth of rhizobia. Rhizobia need a host to grow and fix nitrogen gas and it has been observed that they grow particularly well in the nodules of the roots of leguminous crops. So it has become common practice to inoculate seeds of these crops with the bacteria. This reduces the amount of nitrogen-containing fertilizer that has to be supplied to the crops and improves the soil quality.

However, liquid compositions comprising phosphorus can be quite acidic, especially if the phosphorus source is a phosphoric acid, for example orthophosphoric acid or polyphosphoric acids. And it has been observed that seed treatment compositions comprising an ammonium, nitrate and/or urea source delays or inhibit the formation of nodules, so it is desirable to avoid compounds containing these nitrogen sources in composition for seed treatment. Consequently, common phosphorus sources for fertilizers, such as ammonium phosphate, diammonium phosphate, urea phosphate and ammonium polyphosphate are not recommended although they have a pKa much higher than phosphoric acid.

Further it was observed that solutions containing phosphate salts and molybdate salts, in particular sodium molybdate, were not very stable: precipitation and crystallization were observed. It was found that the pH of the composition could be raised to the desired level by adding monoethanolamine. Monoethanolamine is a small bidentate molecule with a basic site, the primary amine. Adding it to the composition raises the pH, but also stabilizes the phosphate anions.

Monoethanolamine does not contain any nitrogen in a plant-available form, so no detrimental effect to the growth of nodules was observed.

The solvent for the liquid composition may be essentially water, but may also be a solvent mixture comprising water and other solvents suitable for use in agriculture such as alcohols, glycols, and their derivatives, such as ethers. The solvent or solvent mixture must be able to solubilize the different components of the liquid composition at room temperature. Further, it should possess a limited health risk to facilitate its use by farmers or operators. In one embodiment, the solvent is essentially water.

The liquid composition as disclosed herein was coated on seeds of leguminous crops and the seeds were dried and sowed in soil. The germination rate was increased as well as the number of nodules, the mass of roots and the amount of dry matter in the shoots.

In one embodiment, the composition comprises from about 10 to about 250 g/l, in particular from about 50 to about 200 g/l of phosphorus, expressed as $P_2O_5$. It is advantageous to have a high concentration of phosphorus in the liquid composition. This allows providing the seed with a high amount of phosphorus without using a large amount of the composition. However, it is not desirable and/or possible to use a composition with a higher concentration as this leads to stability issues and it could also damage the seeds.

In one embodiment, the composition comprises from about 10 to about 250 g/l, in particular from about 50 to about 200 g/l, of molybdenum. It is advantageous to have a high concentration of molybdenum in the liquid composition. This allows providing the seed with a high amount of molybdenum without using a large amount of the composition.

In one embodiment, vitamin B12 is present as one or more of cobalamin, cyanocobalamin, hydroxocobalamin, methylcobalamin and adenosylcobalamin. Vitamin B12 is also called cobalamin and is a metal complex with a cobalt atom at its centre surrounded by a corrin ring. A corrin ring is a 15-membered macrocyle comprising a pyrrolidine and three dihydropyrrole rings. The metal complex consisting of the metal and the corrin ring is not stable and requires an additional ligand which can be a cyanide group, an hydroxy, a methyl or a 5'-deoxyadenosyl.

In one embodiment, the composition comprises orthophosphoric acid. Orthophosphoric acid is a well-known suitable phosphorus source for agriculture uses. It is widely available and well absorbed by plants.

In one embodiment, the composition comprises a potassium salt of phosphoric acids. The acid may be orthophosphoric acid or a polyphosphoric acid. Potassium is a nutrient for plants, so it may be an advantage to supply it to the seeds to help with the early-stage growth phase. It is compatible with the other components of the liquid composition and does not affect the development of the rhizobia.

In one embodiment, the composition comprises 1 to 45 weight %, in particular 5 to 45, more in particular 10 to 40, even more in particular 15 to 40 weight %, of orthophosphoric acid.

In one embodiment, the composition comprises 1 to 20 weight % of monoethanolamine. In one embodiment, the composition comprises 2 to 20 weight %, in particular 5 to 20, more in particular 5 to 15, even more in particular 10 to 15 weight %, of monoethanolamine.

In one embodiment, the weight ratio of monoethanolamine to orthophosphoric acid ranges from 1:5 to 1:1, in particular from 1:3 to 1:1. The weight ratio of monoethanolamine to orthophosphoric acid needs to be adjusted to optimize the characteristics of the composition. If too little monoethanolamine is added, the solution might not be stable enough and the pH might not be high enough and the rhizobia will not be in optimal conditions. If too much monoethanolamine is used, the cost of the composition will increase unnecessarily, the pH might increase too much and the nutrient content will decrease as monoethanolamine does not bring any plant-available nutrient.

In one embodiment, the composition comprises ethylenediaminetetraacetic acid (EDTA) or any one of its salts, in particular tetrasodium ethylenediaminetetraacetate. A risk when preparing an aqueous solution containing phosphate ions is the risk of forming calcium phosphate which is highly insoluble and water and precipitates out. It is preferable to use a water source with low calcium content to prepare the aqueous composition described herein, however, it might not always be possible depending on the water sources available to farmers. In order to prevent calcium phosphate precipitation, it is possible to add a chelating agent with a strong affinity for calcium. The agent will sequester the calcium present in the water and prevent any formation of calcium phosphate. EDTA is a well-known, widely available chelating agent with a strong affinity to calcium. It is also not toxic to humans or plants, so it does not introduce any additional precautions for the use of the aqueous composition. Another name for EDTA is 2,2',2'',2'''-(ethane-1,2-diyldinitrilo)tetraacetic acid.

In one embodiment, the composition comprises from 0.1 to 1.0 weight %, in particular from 0.1 to 0.7 weight % of EDTA.

In one embodiment, the concentration of vitamin B12 ranges from about 125 mg/l to 500 mg/l. It was found that a low amount of vitamin B12 was enough to obtain significant results in agronomic trials. This was surprising as typical seed treatment compositions contain a much higher Co loading (1 to 2 wt %), especially considering the high molecular weight of vitamin B12 compared to the weight of the Co atom. Co represents about 3.7 to 4.4 weight % of vitamin B12.

In one embodiment, the liquid composition comprises an anti-freeze agent, in particular selected from the group of glycerine, monopropylene glycol, monoethylene glycol, sugars, sugar alcohols or mixtures thereof. For reasons of storage stability under varied climatic conditions, it is advantageous to incorporate an anti-freeze agent in the seed treatment composition. The anti-freeze component must be agriculturally acceptable and have no deleterious effect on *rhizobium* bacteria. Suitable anti-freeze additives are glycerine, monopropylene glycol, monoethylene glycol, sugars and sugar alcohols, such as sorbitol.

In one embodiment, the composition comprises a biostatic agent, in particular selected from the group of sodium propionate, lactic acid and mixtures thereof. In one embodiment, the composition comprises sodium propionate and lactic acid. It has been discovered that liquid compositions as described above are susceptible to biological spoilage by, for example, growth of mould. It is therefore advantageous to incorporate a preservative in the composition. However, the use of typical broad spectrum biocides such as 2-methyl-2H-isothiazolin-3-one (MIT) or 1,2-benzisothiazol-(2H)-one (BIT) is not desirable as these could have a deleterious effect on *rhizobium* bacteria if the composition was to be co-applied to seed with inoculant. Therefore it has been found that the use of biostatic agents such as sodium propionate or lactic acid are more suitable as they protect the composition from spoilage but do not destroy *rhizobium* bacteria when mixed in a co-applied seed treatment.

In one embodiment, the composition comprises orthophosphoric acid, monoethanolamine, tetrasodium EDTA, sodium molybdate, cyanocobalamin, glycerine, sodium propionate, lactic acid and water.

In one embodiment, the composition comprises orthophosphoric acid, monoethanolamine, tetrasodium EDTA, sodium molybdate, cyanocobalamin, monopropylene glycol, sodium propionate, lactic acid and water.

In one embodiment, the composition comprises orthophosphoric acid, monoethanolamine, tetrasodium EDTA, sodium molybdate, cyanocobalamin, monoethylene glycol, sodium propionate, lactic acid and water.

In one embodiment, the composition comprises from 1 to 45 wt % of orthophosphoric acid, from 1 to 20 wt % of monoethanolamine, from 0.1 to 1.0 wt % of tetrasodium EDTA, from 1 to 25 wt % of sodium molybdate, from 0.001 to 1.0 wt % of cyanocobalamin, in particular from 0.001 to 0.1 wt % of cyanocobalamin, from 1 to 15 wt % of glycerine, from 0.01 to 1.0 wt % of sodium propionate, from 0.01 to 1.0 wt % of lactic acid and from 40 to 80 wt % of water.

According to another aspect, a method to prepare a liquid composition comprising phosphorus, molybdenum, cobalt and monoethanolamine is provided. The method comprises the steps of providing a source of phosphorous, a source of molybdenum, a source of vitamin B 12, and monoethanolamine; mixing the source of phosphorus, the source of molybdenum, and the source of vitamin B12 with a solvent; and adding an amount of monoethanolamine such that the pH is between 6.0 and 7.5.

The solvent to prepare the liquid composition may comprise water, but also other solvents suitable for use in agriculture such as alcohols, glycols, and their derivatives, such as ethers. The solvent or solvent mixture must be able to solubilize the different components of the liquid composition at room temperature. Further, it should possess a limited health risk to facilitate its use by farmers or operators. In one embodiment, the solvent is essentially water.

In one embodiment, the liquid composition prepared according to the method above comprises from about 10 to about 250 g/l, in particular from about 50 to about 200 g/l of phosphorus, expressed as $P_2O_5$.

In one embodiment, the liquid composition prepared according to the method above comprises from about 10 to about 250 g/l, in particular from about 50 to about 200 g/l, of molybdenum.

In one embodiment, the source of molybdenum is essentially sodium molybdate.

In one embodiment, the source of vitamin B12 is selected from the group of cobalamin, cyanocobalamin, hydroxocobalamin, methylcobalamin, adenosylcobalamin, and mixtures thereof.

In one embodiment, the source of phosphorus is selected from the group of orthophosphoric acid, polyphosphoric acid or any salts thereof. In one embodiment, the source of phosphorus is essentially orthophosphoric acid.

In one embodiment, the amount of monoethanolamine is selected so that the weight ratio of monoethanolamine to orthophosphoric acid in the final composition ranges from 1:5 to 1:1, in particular from 1:3 to 1:1.

In one embodiment, ethylenediaminetetraacetic acid (EDTA) or any one of its salts, in particular tetrasodium ethylenediaminetetraacetate is provided and mixed in the solution in step b) described above.

In one embodiment, an antifreeze agent is provided and mixed in the solution in step b) described above. In one embodiment, the anti-freeze agent is selected from the group of glycerine, monopropylene glycol, monoethylene glycol, sugars, sugar alcohols or mixtures thereof.

In one embodiment, a biostatic agent is provided and mixed in the solution in step b) described above. In one embodiment, the biostatic agent is selected from the group of sodium propionate, lactic acid and mixtures thereof.

According to another aspect, a method of preparing seeds of leguminous crops is provided. The method comprises the steps of coating the seeds with the liquid composition described herein, coating the seeds with a composition comprising a rhizobia inoculant and drying the seeds coated with both compositions.

Methods for coating seeds with a liquid solution are well known in the field of agriculture. Any known coating method is suitable to realise the present method, for example, a rotary seed coater, a drum seed coater, a fluidized bed seed treatment apparatus, or a standard blending drum. The order of coating application is not critical for obtaining the desired technical effect. The composition comprising phosphorus, molybdenum and vitamin B12 may be coated first followed by the coating of the rhizobia inoculant; or it may be coated after the inoculant; or both solutions may be added at the same time to the seeds. The seeds are dried at room temperature, but they may also be exposed to a slightly pre-warmed stream of air to accelerate the drying.

In one embodiment, the liquid composition is applied to the seeds at a rate from about 0.5 l per tonne to about 5 l per tonne. The rate of application should be high enough to supply enough of the nutrients to the seeds, but too much might reduce or slow down the germination. In addition, a high loading might make the seeds sticky and difficult to handle and spread.

In one embodiment, the composition comprising a rhizobia inoculant is applied to the seeds at a rate from about 1 l per tonne to about 10 l per tonne. Commercial solutions come with a suggested application rate. Small deviations from the recommended may be accepted to take into account the application of the other liquid composition.

In one embodiment, the liquid composition described herein is directly applied to the soil before or after planting the seeds.

According to another aspect, the use of a liquid composition as defined herein for the treatment of seeds of leguminous crops, in particular to improve germination, is provided.

Example 1

The following example shows the formulation required to make 1 litre of a liquid seed treatment composition containing 125 mg/l cyanocobalamin. The grades of raw materials used were as follows: Orthophosphoric acid—high purity (food grade); monoethanolamine 90%—made by dilution of high purity 99% monoethanolamine; tetrasodium EDTA—technical grade, 86% assay; sodium molybdate—high purity disodium molybdate dihydrate, minimum 39.5% w/w Mo; cyanocobalamin—pure crystalline grade minimum 96% assay; glycerine—technical grade minimum 99.5% purity; sodium propionate—food grade; lactic acid—food grade 80%.

Water: 659.945 g
Orthophosphoric acid 75%: 231.25 g
Monoethanolamine 90%: 120.45 g
Tetrasodium EDTA: 2.60 g
Sodium molybdate: 163.50 g
Cyanocobalamin: 0.125 g
Glycerine: 80.00 g
Sodium propionate: 1.00 g
Lactic acid 80%: 1.00 g The method used to make the composition was as follows:

Water (600 ml) was placed in a glass vessel fitted with an impeller stirrer. Under stirring, the components were added in the following order, ensuring complete dissolution of each one before continuing to the next: tetrasodium EDTA, monoethanolamine 90%, orthophosphoric acid 75%. lactic acid, glycerine, sodium molybdate, cyanocobalamine (pre-dissolved in 50 ml water), sodium propionate. Finally the remaining water was added to make the volume up to 1 litre.

The resultant product was a clear red solution with the following physiochemical characteristics:

Density: 1.26 kg/l
pH: 6.0-7.0
$P_2O_5$ Content: 12.5% w/v (125 g/l)
Mo Content: 6.5% w/v (65 g/l)
Cyanocobalamin: 125 mg/l The product remained stable for at least 8 weeks when stored at room temperature, 0° C. and 45° C.

Example 2

The following example shows the formulation required to make 1 litre of a liquid seed treatment composition containing 250 mg/l cyanocobalamin.

Water: 659.82 g
Orthophosphoric acid 75%: 231.25 g
Monoethanolamine 90%: 120.45 g
Tetrasodium EDTA: 2.60 g
Sodium molybdate: 163.50 g
Cyanocobalamin: 0.25 g
Glycerine: 80.00 g
Sodium propionate: 1.00 g
Lactic acid 80%: 1.00 g The production method was as described above and the resultant product was a clear red solution with the following physiochemical characteristics:

Density: 1.26 kg/l
pH: 6.0-7.0
$P_2O_5$ Content: 12.5% w/v (125 g/l)
Mo Content: 6.5% w/v (65 g/l)
Cyanocobalamin: 250 mg/l The product remained stable for at least 8 weeks when stored at room temperature, 0° C. and 45° C.

Example 3

The following example shows the formulation required to make 1 litre of a liquid seed treatment composition containing 500 mg/l cyanocobalamin, Water: 659.57 g
Orthophosphoric acid 75%: 231.25 g
Monoethanolamine 90%: 120.45 g
Tetrasodium EDTA: 2.60 g
Sodium molybdate: 163.50 g
Cyanocobalamin: 0.125 g
Glycerine: 80.00 g
Sodium propionate: 1.00 g
Lactic acid 80%: 1.00 g The production method was as described above and the resultant product was a clear red solution with the following physiochemical characteristics:

Density: 1.26 kg/l
pH: 6.0-7.0
$P_2O_5$ Content: 12.5% w/v (125 g/l)
Mo Content: 6.5% w/v (65 g/l)
Cyanocobalamin: 500 mg/l The product remained stable for at least 8 weeks when stored at room temperature, 0° C. and 45° C.

Example 4

Seed treatment compositions according to Examples 1, 2 and 3 above were tested for agronomic efficacy against a commercial Co/Mo seed treatment product containing 62.5 g/l Mo and 12.5 g/l Co (derived from sodium molybdate and cobalt (II) sulphate). The trial was conducted on soybean (*Glycine max*), variety "Elena" and was arranged in a randomized complete block design using six replications. Each seed treatment composition was co-applied to the soybean seed along with liquid rhizobia inoculant ("Liquifix", Legume Technology Ltd). An untreated control and a control treated with only inoculant were included in the trial. The following table summarizes the treatments used in the trial:

| No | Treatment | Inoculant Rate | Fertilizer Seed Treatment Rate |
|---|---|---|---|
| 1 | Control 1 - No treatment | — | — |
| 2 | Control 2 - Inoculant Only | 4 l/MT | — |
| 3 | Commercial Co/Mo Product 62.5 g/l Mo and 12.5 g/l Co | 4 l/MT | 2 l/MT |
| 4 | Composition Example 1 - 125 mg/l B12 | 4 l/MT | 2 l/MT |
| 5 | Composition Example 2 - 250 mg/l B12 | 4 l/MT | 2 l/MT |
| 6 | Composition Example 3 - 500 mg/l B12 | 4 l/MT | 2 l/MT |

The treated seed was allowed to air dry overnight before being sown into 5 cm pots filled with a growing medium composed of a 1:1 mixture of vermiculite and perlite (one seed per pot). The pots were watered with de-ionized water and placed in a growth chamber. Watering with de-ionized water was continued during the germination period. After emergence the plants were watered with a nitrogen-free, half-strength nutrient solution (pH 6.0). Germination rate was assessed 7 days after sowing and plants were harvested 21 days after sowing to record the number of nodules formed. The results are shown in the table below:

| No | Treatment | Germination Rate (7 days after sowing) |
|---|---|---|
| 1 | Control 1 - No treatment | 83.3% |
| 2 | Control 2 - Inoculant Only | 72.2% |
| 3 | Commercial Co/Mo Product | 83.3% |
| 4 | Example 1 | 100.0% |
| 5 | Example 2 | 100.0% |
| 6 | Example 3 | 88.9% |

Example 5

Seed treatment compositions according to Examples 1 and 3 above were further tested for agronomic efficacy in comparison with a commercial Co/Mo seed treatment product containing 62.5 g/l Mo and 12.5 g/l Co (derived from sodium molybdate and cobalt (II) sulphate). The trial was conducted on soybean (*Glycine max*), variety "Silverka" and was arranged in a randomized complete block design using 4 replications. Each seed treatment composition was co-applied to the soybean seed along with liquid rhizobia inoculant ("Liquifix", Legume Technology Ltd). An untreated control and a control treated with only inoculant were included in the trial. The following table summarizes the treatments used in the trial:

| No | Treatment | Inoculant Rate | Fertilizer Seed Treatment Rate |
|---|---|---|---|
| 1 | Control 1 - No treatment | — | — |
| 2 | Control 2 - Inoculant Only | 4 l/MT | — |
| 3 | Commercial Co/Mo Product 62.5 g/l Mo and 12.5 g/l Co | 4 l/MT | 2 l/MT |
| 4 | Composition Example 1 - 125 mg/l Cyanocobalamin | 4 l/MT | 2 l/MT |
| 5 | Composition Example 3 - 500 mg/l Cyanocobalamin | 4 l/MT | 2 l/MT |

The treated seed was allowed to air dry overnight before being sown into 20 cm pots filled with washed sand (5 seeds per pot). The pots were placed in a climate controlled glasshouse and watered with de-ionized water for 7 days during the germination period. After emergence the plants were watered with a nitrogen-free, half-strength nutrient solution (pH 6.0, containing half optimum concentrations of P, K, Mg, Ca, B, Cu, Fe, Mn, Mo, Zn). The plants were visually assessed and harvested 6 weeks after sowing. The root systems were rinsed with water to remove adhering sand and the following parameters recorded: number of nodules, dry weight of roots, dry weight of shoots. Nodules were examined to assess whether they were active by cutting them open (pink tissue coloration was taken as an indication that they were active). The results are shown in the table below:

| No | Treatment | Number of nodules (per pot) | Root dry matter (per pot) (g) | Shoot dry matter (per pot) (g) |
|---|---|---|---|---|
| 1 | Control 1 - No treatment | 0.00 | 2.78 | 3.11 |
| 2 | Control 2 - Inoculant Only | 88.25 | 1.92 | 4.55 |
| 3 | Commercial Co/Mo Product | 96.25 | 2.94 | 4.88 |
| 4 | Example 1 | 101.25 | 4.26 | 5.43 |
| 5 | Example 3 | 118.00 | 3.72 | 4.61 |

Visual observation of the plants at the time of harvest showed that those without any treatment were very small and stunted, with yellow leaves; plants treated with inoculant only showed better growth and development than the untreated control plants but were smaller and less developed than those in Treatments 3, 4 and 5 which were larger and greener. Nodules from the plants in treatments 3, 4 and 5 were observed to be pink in colour when cut open indicating that they were active. Nodules from plants in Treatments 4 and 5 were observed to be generally larger in size than those from Treatment 3, suggesting earlier establishment of nodules with Treatments 4 and 5.

The invention claimed is:

1. A liquid composition comprising a source of molybdenum, a source of phosphorus selected from the group of orthophosphoric acid and polyphosphoric acids, vitamin B12, monoethanolamine and a solvent, wherein the composition has a pH between 6.0 and 7.5, and wherein the composition comprises from 10 to 250 g/L of molybdenum, from 50 to 250 g/L of phosphorus, expressed as $P_2O_5$, and from 1 to 20 weight % of monoethanolamine, and
   wherein the monoethanolamine is added to the composition as molecular monoethanolamine.

2. The liquid composition according to claim 1, wherein the solvent is essentially water.

3. The liquid composition according to claim 1, wherein the composition comprises sodium molybdate as the source of molybdenum.

4. The liquid composition according to claim 1, wherein vitamin B12 is present as one or more of cobalamin, cyanocobalamin, hydroxocobalamin, methylcobalamin and adenosylcobalamin.

5. The liquid composition according to claim 1, wherein the composition comprises orthophosphoric acid, and wherein the weight ratio of monoethanolamine to orthophosphoric acid ranges from 1:5 to 1:1.

6. Liquid composition according to claim 1, wherein the composition comprises ethylenediaminetetraacetic acid (EDTA) or any one of its salts.

7. Liquid composition according to claim 1, wherein the concentration of vitamin B12 ranges from about 125 mg/l to 500 mg/l.

8. Liquid composition according to claim 1, wherein the composition comprises an anti-freeze agent.

9. Liquid composition according to claim 1, wherein the composition comprises a biostatic agent.

10. A method of preparing a liquid composition, comprising the steps of
    a) providing a source of phosphorus selected from the group of orthophosphoric acid and polyphosphoric acids, a source of molybdenum, a source of vitamin B12, and monoethanolamine;
    b) mixing the source of phosphorus, the source of molybdenum, and the source of vitamin B12 with a solvent; and
    c) adding an amount of monoethanolamine such that the pH is between 6.0 and 7.5;
    wherein the resulting composition comprises from 10 to 250 g/L of molybdenum, from 50 to 250 g/L of phosphorus, expressed as $P_2O_5$, and from 1 to 20 weight % of monoethanolamine, and
    wherein the monoethanolamine is added to the composition as molecular monoethanolamine.

11. A method of preparing seeds of leguminous crops comprising the steps of:
    a) coating the seeds with the liquid composition as defined in claim 1;
    b) coating the seeds with a composition comprising a rhizobia inoculant;
    c) drying the seeds coated with both compositions.

12. The method according to claim 11, wherein in step a), the liquid composition is applied to the seeds at a rate from about 0.5 l per tonne to about 5 l per tonne.

13. A method for improving germination of the seeds of leguminous crops, comprising applying a liquid composition as defined in claim 1 to the seeds.

14. The liquid composition according to claim 1, wherein the composition comprises from about 50 to about 200 g/l of phosphorus, expressed as $P_2O_5$.

15. The liquid composition according to claim 1, wherein the composition comprises from about 50 to about 200 g/l of molybdenum.

16. The liquid composition according to claim 1, wherein the composition comprises orthophosphoric acid, and wherein the weight ratio of monoethanolamine to orthophosphoric acid ranges from 1:3 to 1:1.

17. The liquid composition according to claim 1, wherein the composition comprises tetrasodium ethylenediaminetetraacetate.

18. The liquid composition according to claim 1, wherein the composition comprises a biostatic agent selected from the group of sodium propionate and lactic acid.

* * * * *